United States Patent [19]

Fujita et al.

[11] Patent Number: 5,349,012
[45] Date of Patent: Sep. 20, 1994

[54] PROCESS FOR PREPARING RUBBER-MODIFIED STYRENE RESINS

[75] Inventors: Toshio Fujita, Kitakyushu; Masanari Fujita, Kimitsu; Naoto Takeda, Kimitsu; Koji Hirashima, Kimitsu, all of Japan

[73] Assignee: Nippon Steel Chemical Co., Ltd., Tokyo, Japan

[21] Appl. No.: 82,506

[22] Filed: Jun. 25, 1993

Related U.S. Application Data

[63] Continuation of Ser. No. 663,526, Mar. 4, 1991, abandoned.

[30] Foreign Application Priority Data

Mar. 2, 1990 [JP] Japan .................................. 2-49548
Sep. 20, 1990 [JP] Japan .................................. 2-248784

[51] Int. Cl.$^5$ .......................................... C08F 279/021
[52] U.S. Cl. ........................................ 525/52; 525/53; 525/316
[58] Field of Search ................. 525/52, 53, 263, 316

[56] References Cited

U.S. PATENT DOCUMENTS

| | | | |
|---|---|---|---|
| 3,981,944 | 9/1976 | Okamoto et al. | 525/53 |
| 4,026,967 | 5/1977 | Flexman, Jr. et al. | 525/52 |
| 4,282,334 | 8/1981 | Walter et al. | 525/53 |
| 4,451,612 | 5/1984 | Wang et al. | 525/53 |
| 4,640,959 | 2/1987 | Alle | 525/53 |
| 4,686,263 | 8/1987 | Beck et al. | 525/316 |
| 4,777,210 | 10/1988 | Sosa et al. | 525/53 |
| 4,952,627 | 8/1990 | Morita et al. | 525/53 |

FOREIGN PATENT DOCUMENTS

| | | |
|---|---|---|
| 47-7241 | 4/1972 | Japan . |
| 55-149311 | 11/1980 | Japan . |
| 63-118315 | 5/1988 | Japan . |
| 1-252648 | 10/1989 | Japan . |
| 2-191617 | 7/1990 | Japan . |
| 2-208311 | 8/1990 | Japan . |

OTHER PUBLICATIONS

Molau et al "Heterogeneous Polymer Systems." Journal of Polymer Science, Part A-1, vol. 4 (1966), pp. 1595-1607.
WO-A-9 010 656.
WPIL, File Supplier, AN-90-331461 Derwent Publication Ltd, London, GB; & JP-A-02 238 011.
WPIL, File Supplier, AN-90-352926 Derwent Publication Ltd, London, GB; & JP-A-02 255 815.
WPIL, File Supplier, AN-88 177735 Derwent Publication Ltd, London, GB; & JP-A-63 113 009.
WPIL, File Supplier, AN-86-209552 Derwent Publication Ltd, London, GB; & JP-A-61 143 414.
WPIL, File Supplier, AN-88 230503 Derwent Publication Ltd, London, GB; & JP-A-63 162 713.

Primary Examiner—Vasu S. Jagannathan
Attorney, Agent, or Firm—Nikaido, Marmelstein, Murray & Oram

[57] ABSTRACT

Rubber-modified styrene resins with excellent impact resistance are prepared by formulating a feed from a styrene-based monomer, or a mixture thereof with comonomers and high-viscosity rubber, an organic peroxide, and, if necessary, all inert organic solvent, preheating and continuously supplying the feed to one end of a plug flow type reactor equipped with an agitator, performing the preliminary polymerization to a conversion sufficiently high for the transformation of the rubber in the feed into particles while controlling the weight average particle diameter of the rubber particles to 0.8 to 5 μm, withdrawing the prepolymerized feed from the other end of the reactor, and supplying it to a following plug flow type reactor for continuous enhancement of tile conversion.

6 Claims, 1 Drawing Sheet

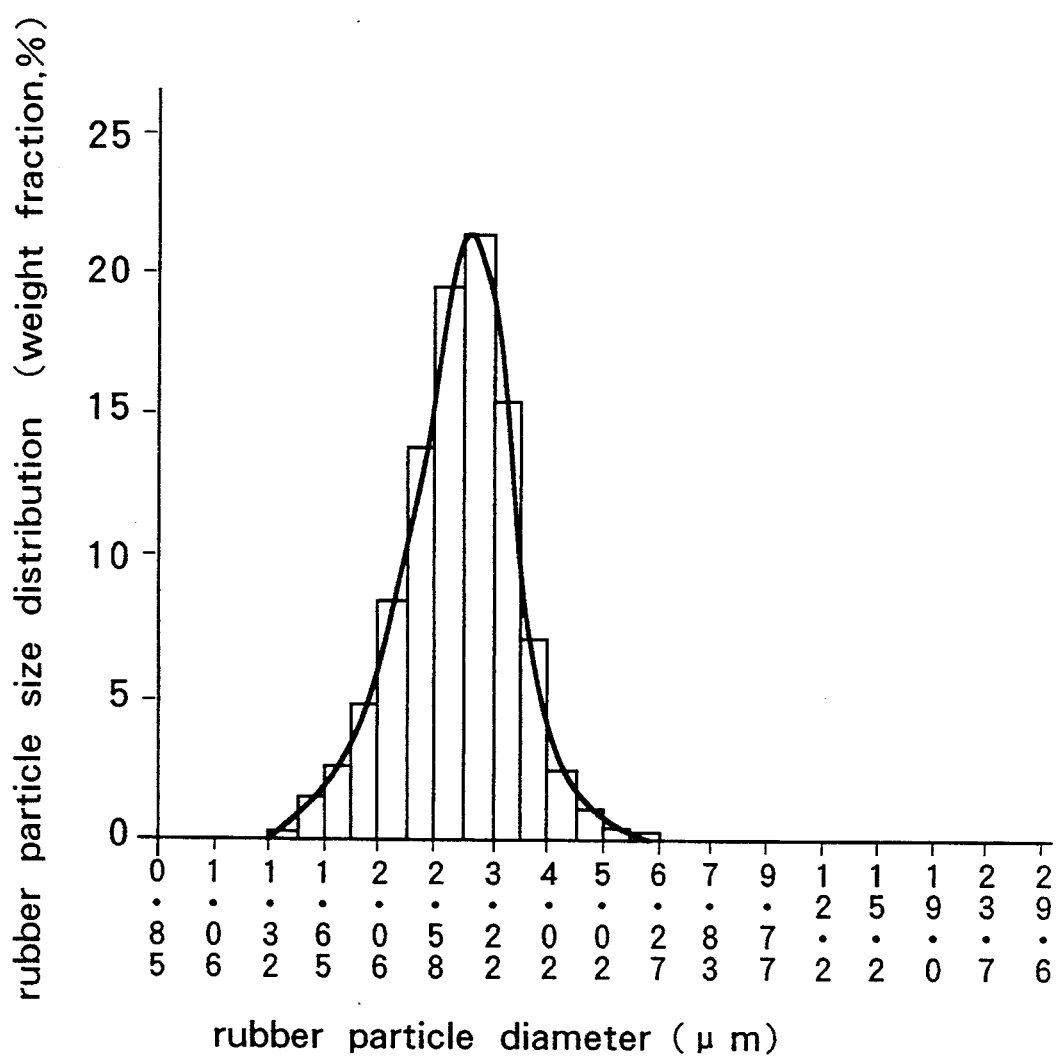

PROCESS FOR PREPARING RUBBER-MODIFIED STYRENE RESINS

This application is a continuation division of application Ser. No. 07/663,526 filed Mar. 4, 1991, now abandoned.

FIELD OF THE INVENTION AND RELATED ART STATEMENT

This invention relates to a process for preparing rubber-modified styrene resins with excellent impact resistance.

The preparation of rubber-modified styrene resins with excellent impact resistance requires an exercise of proper control over the diameter and diameter distribution of rubber particles dispersed in the resins. The resins tend to improve in appearance but degrade in impact resistance as the rubber particle diameter diminishes and the optimal particle diameter is generally said to be in the range from 0.8 to 5 $\mu$m, preferably from 1.5 to 4 $\mu$m.

On the other hand, the impact resistance of rubber-modified styrene resins is closely related to the content of styrene polymers occluded in the rubber particles and is said to improve with the increasing content of the occluded styrene polymers.

It is therefore beneficial for the improvement of the impact resistance and other mechanical strengths of rubber-modified styrene resins to maximize the rubber particle diameter without adversely affecting the appearance of the resins and, at the same time, to increase the content of styrene polymers occluded in the rubber particles.

The present inventors earlier disclosed a process which comprises effecting preliminary polymerization in two complete mixing type reactors, until before the rubber phase inversion in the first reactor and until after the rubber phase inversion in the second, in Japan Tokkyo Kokai Koho Nos. 63-118,315 (1988) and proposed there to control the quantity of occluded styrene polymers by controlling the solid content in the aforesaid first reactor at a relatively high level, tile solid content in the aforesaid second reactor at a relatively low level, and the difference of the two solid contents in a specified range and thereafter raising the conversion in a plug flow type reactor.

This process attempts to produce rubber particles with a high content of occluded styrene polymers by effecting the polymerization until immediately before the rubber phase inversion in the first reactor and then at the lowest possible conversion in the second reactor. It is theoretically known that the smaller the difference in solid content before and after the phase conversion, the more favorable the results will be. A process based on complete mixing type reactors arranged in series, however, is limited in its capability of lowering the difference in solid content between tile reactors before and after the phase inversion.

It is conceivable to maintain the difference in solid content before and after the phase inversion at an extremely low level by effecting the polymerization in a tower type reactor containing a plurality of consecutive reaction zones, namely a plug flow type reactor.

As pointed out in the past, however, the adoption of plug flow type reactors in the initial phase of polymerization including the phase inversion will encounter the problems of difficult control of the rubber particle diameter and generation of gel-like foreign substances inside the reactor and adhesion of incomplete polymerizates to the reactor wall. These phenomena are known to be more pronounced when an organic peroxide is added as polymerization initiator in order to increase the quantity of polystyrene to be trapped in rubber in the initial phase of the reaction.

Under the conditions designed for increased occlusion of styrene polymers in rubber particles, more graft polymers form between rubber particles and styrene to increase the content of occluded styrene polymers on the one hand and act as surfactant between rubber particles and styrene polymers constituting a continuous phase on the other and, as a result, the rubber particles become dispersed extremely finely with reduction in particle diameter.

In the cases where a plug flow type reactor is used together with an organic peroxide, the addition of the peroxide must be kept at such a level as to allow control of the rubber particle diameter within the desired range and this requirement makes it extremely difficult to inrease the quantity of styrene polymers occluded in rubber particles.

Addition of a radical chain transfer agent such as a molecular weight controller is known to overcome the problem of excessive reduction of particle size in a plug flow type reactor. Such addition suppresses the graft reaction and causes an increase in the particle diameter but not enough in the content of occluded styrene polymers and this approach is not satisfactory in respect to the product quality.

Furthermore, processes disclosed in Japan Tokkyo Koho Nos. 55-8,526 (1980) and 59-17,126 (1984) propose to change the rubber particle diameter at the time of phase inversion by taking out a portion of the partially polymerized process: stream from a site after the phase inversion in the reactor, recycling said portion to a site before the phase inversion, and changing the amount of recycle and the agitator speed.

These processes can control the particle diameter and the particle size distribution of rubber, but they accomplish this at the sacrifice of plug flow and are not satisfactory from the viewpoint of producing rubber particles with a high content of occluded styrene polymers.

Reduction of the rotating speed of an agitator at the time of phase inversion can increase the rubber particle diameter to some extent but impairs the mixing performance, resulting in broadening of the rubber particle size distribution, lowering of the heat-removing capability of the reactor, generation of gel-like foreign substances inside the reactor, and adhesion of incomplete polymerizates to the reactor wall. Hence, reduction of the agitation speed is not a very desirable approach.

OBJECT AND SUMMARY OF THE INVENTION

The present inventors undertook extensive studies to solve the problems in the known processes mentioned above, found that the rubber particle diameter is affected in large measure by the solution viscosity of feed rubber when the rubber particles are dispersed still in an unstable state during or immediately after the phase inversion and that the resin properties can be improved markedly by controlling the rubber particle diameter within the desired range and also adding an organic peroxide catalyst as much as is necessary even in the polymerization in a plug flow type reactor, a task hitherto regarded difficult to accomplish, by the use of rubber showing a higher solution viscosity in styrene than known up to the present, and completed this invention.

At the same time, the present inventors found that preliminary heating of the feed to be supplied to a plug flow type reactor equipped with an agitator under the conditions which keep the conversion at a level below that during the rubber phase inversion can solve the problems of generation of gel-like foreign substances inside the reactor and adhesion of incomplete polymerizates to the reactor wall and incorporated the finding in this invention.

It is therefore an object of this invention to provide a process for preparing rubber-modified styrene resins which is capable of promoting the graft reaction in the initial phase of the polymerization and increasing the content of occluded styrene polymers after the phase inversion and at the same time yielding rubber-modified styrene resins containing rubber particles with optimal average diameter and diameter distribution.

This invention thus relates to a process for preparing rubber-modified styrene resins with excellent impact resistance which comprises preheating a feed containing 100 parts by weight of reactants consisting of 98 to 88% by weight of a styrene-based monomer or a mixture thereof with other copolymerizable monomers and 2 to 12% by weight of high-viscosity rubber showing a viscosity of 400 to 2,000 centipoises in a 5% by weight solution in styrene at 25° C., 0.01 to 0.2 part by weight of an organic peroxide and, as needed, 0 to 30 parts by weight of an inert organic solvent, supplying continuously said preheated feed to one end of a plug flow type reactor equipped with an agitator or a plurality of said reactors connected in series wherein the preliminary polymerization is effected with agitation until a sufficient conversion is attained for transformation of said rubber into particles and the weight average diameter of said rubber particles in resins is controlled at 0.8 to 5 μm, withdrawing the initial reaction mixture from the other end of said reactor, and supplying said mixture to the following plug flow type reactor wherein the conversion is raised continuously. A preferred embodiment of the process of this invention is to preheat a feed in a complete mixing type tank at a conversion of 10% by weight or less under the conditions prevailing prior to the rubber phase inversion and supply said preheated feed solution continuously to one end of a plug flow type reactor equipped with an agitator and also to choose a rubber which satisfies the relationship $$1.8 \log SV + \log R > 5.7$$

where SV is the viscosity in centipoise of the rubber in a 5% by weight styrene solution at 25° C. and R is the content in % by weight of the rubber in the reactants.

The process of this invention is thus based in principle on preliminary heating of a feed containing a polymerization initiator and rubber of an extremely high solution viscosity followed by polymerization of said feed with continuous raising of the conversion in a plug flow type reactor in order to increase the amount of occluded styrene polymers.

The rubbers to be used in this invention should show a solution viscosity (hereinafter referred to as SV) in the range from 400 to 2,000 centipoises, preferably from 500 to 1,500 centipoises, as determined in styrene at 25° C. and a concentration of 5% by weight. At an SV of less than 400 centipoises, the rubber particle diameter becomes too small for sufficient agitation. At an SV in excess of 2,000 centipoises, the rubber becomes less soluble in a styrene-based monomer and the productivity of rubber-modified styrene resins is affected adversely.

The rubbers useful for this invention include polybutadiene and styrene-butadiene copolymer (SBR). In the case of SBR, butadiene-styrene copolymers containing 3 to 20% by weight of bound styrene are preferable.

It is desirable to vary the SV with the rubber content in the reactants (R in % by weight) so that the smaller the content R, the higher the SV becomes. The experiments conducted by the present inventors indicate that, at a given R, it is desirable to select rubber with an SV satisfying the following relationship $$1.8 \log_{10} SV + \log_{10} R > 5.7$$

in order to maintain the weight average rubber particle diameter at 0.8 μm or more in the intended rubber-modified styrene resins.

The styrene-based monomers to be used in this invention include styrene and substituted styrene such as α-methylstyrene, p-methylstyrene, and chlorostyrene, applicable singly or as a mixture of two or more, styrene being preferable. The comonomers to be polymerized with such styrene-based monomers include acrylonitrile, maleic anhydride, and methyl methacrylate.

The composition of the reactants containing the aforesaid styrene-based monomer or a mixture thereof with comonomers and the aforesaid rubber is 98 to 88% by weight, preferably 97 to 90% by weight, of the styrene-based monomer or a mixture of thereof with comonomers and 2 to 12% by weight, preferably 3 to 10% by weight, of the rubber. The use of less than 2% by weight of the rubber does not improve the impact resistance so much as intended by this invention. On the other hand, the effect for improving the impact resistance levels off with rubber used in excess of 12% by weight.

The process of this invention requires 0.01 to 0.2 part by weight of a polymerization initiator, an organic peroxide such as 1,1-di(tert-butylperoxy) cyclohexane, benzoyl peroxide, and lauroyl peroxide, per 100 parts by weight of the aforesaid reactants. The peroxide helps to increase the formation of graft polymers and the content of styrene polymers occluded in the rubber particles, which in turn contributes to marked improvement in mechanical strength such as impact strength. Less than 0.01 part by weight of such organic peroxide is not very effective for producing the anticipated effect while more than 0.2 part by weight is not practical as it enhances the rate of polymerization too much. The peroxide may be added before or after the preheater or at several points before and after the preheater. If necessary, a supplementary amount of the peroxide may be added at some point in the plug flow type reactor.

Moreover, in the process of this invention, an inert organic solvent such as toluene, xylene, and ethylbenzene, either singly or as a mixture of two or more, may be used it necessary. The amount of such solvent is 0 to 30 parts by weight, preferably 0 to 25 parts by weight, per 100 parts by weight of the aforesaid reactants. Use in excess of 30 parts by weight is not advantageous economically as it markedly reduces the rate of polymerization.

It is also allowable to add a chain transfer agent, a mercaptan such as tertdodecyl mercaptan, in an amount of 0 to 200 ppm, preferably 100 ppm or less, for control of the molecular weight. A chain transfer agent, however, is known to decrease the content of styrene polymers occluded in the rubber particles and lower the mechanical strength of the resins and it should preferably be added in an extremely small amount, if any, or not at all.

In the process of this invention, it is desirable to submit the feed of the aforesaid composition to preliminary heating with agitation in a complete mixing type tank wherein the conversion is held at 10% by weight or less and the conditions prevailing before the rubber phase inversion are maintained. If the feed is supplied without preliminary heating to the plug flow type reactor, abrupt heating takes place near the inlet facilitating the generation of gel-like foreign substances inside the reactor and the adhesion of incomplete polymerizates to the reactor wall. On the other hand, preliminary heating effected not as above but in the plug flow type reactor with its portion near the inlet serving as preheater reduces the reaction rate and, in turn, the effective area of the reactor. Furthermore, temperature control and operation become difficult if heating and heat removal are to be performed in a single reactor.

In the preliminary heating of the aforesaid feed, it is desirable to heat the feed so that it becomes approximately 80° to 110° C. immediately before its entrance into the plug flow type reactor and a part of the feed may be allowed to polymerize here. This is because the partial polymerization enhances the solution viscosity and aids the plug flow type reactor to perform its proper function well from the initial phase. Here, however, the conversion should be kept at 10% by weight or less and the conditions before the rubber phase inversion should be maintained.

There is no specific limitation to the type of a preheater. A multitube heat exchanger is not desirable as it cannot be heated fully because of the problem of resin adhesion. On the other hand, a complete mixing type tank is satisfactory as it can prevent the resin adhesion by raising the speed of rotation and it can also be heated fully.

The preheated feed is continuously supplied to one end of a plug flow type reactor equipped with an agitator or a plurality of such reactors connected in series and submitted there to preliminary polymerization to such a level of conversion as is sufficient for the transformation of rubber in the feed into particles. An example of such a reactor is a slender vertical tower reactor which can add a shearing action by a horizontal agitating blade and is substantially free of back mixing.

In such plug flow type reactor equipped with an agitator, it is desirable to keep the polymerization temperature at the inlet side roughly equal to the temperature of the preheated feed. By controlling the agitation speed of the plug flow type reactor under this temperature condition, the polymerization is carried out continuously from the state before tile so-called rubber phase inversion where the monomer solution of the rubber forms a continuous phase and that of styrene polymers a disperse phase to the state after the rubber phase inversion where the monomer solution of the rubber forms a disperse phase and that of styrene polymers a continuous phase.

There is no specific limitation to the degree of prepolymerization in this invention as long as the prevailing condition is that after the rubber phase inversion. As the prepolymerization is conducted with a relatively vigorous agitation, it is desirable to keep the conversion of the monomer at 50% by weight or less, preferably in the range from 20 to 40% by weight.

The solution viscosity of the monomer solution of the rubber is fairly high in the process of this invention and this enables easy control of the weight average particle diameter of the rubber in polymers in the range from 0.8 to 5 $\mu m$ by controlling the agitation speed and the conversion in the plug flow type reactor.

The prepolymerized feed withdrawn from the other end of the reactor is supplied continuously to the following plug flow type reactor where the conversion is raised further. There is no specific limitation to the following plug flow type reactor and a slender vertical tower reactor equipped with an agitator suitable for use under mild agitation or a plug flow type reactor fitted with a static mixer may be used singly or in combination. In combined use, for example, control is exercised to effect the polymerization to a conversion of 60% by weight or less in the former reactor and then to 60 to 100% by weight in the latter reactor.

The feed thus polymerized to a high conversion is stripped of the unchanged monomer, if any, by a known procedure, for example, by devolatilization under heat and reduced pressure, and processed into products of desired shape such as chopped strands.

The use of high-SV rubbers in the process of this invention produces a good plug flow in a plug flow type reactor equipped with au agitator, secures easy control over the agitating shear energy during the phase inversion, promotes the peroxide-induced graft reaction in the initial phase of the polymerization, and contributes not only to an increase in the content of occluded styrene polymers after the phase inversion but also to the production of rubber-modified styrene resins having optimal average particle diameter and particle diameter distribution of the rubber.

The feed is thus preheated at a conversion of 10% by weight or less under the conditions prevailing prior to the rubber phase inversion and introduced into a plug flow type reactor. In consequence, a good plug flow is maintained from the initial phase and abrupt heating near the inlet is prevented, which solves the problems of the generation of gel-like foreign substances inside the reactor and the adhesion of incomplete polymerizates to the reactor wall.

BRIEF DESCRIPTION OF THE DRAWING

FIG. 1 is a graph showing the relationship between the rubber particle diameter and the rubber particle size distribution (weight fraction) in Example 1.

DETAILED DESCRIPTION OF THE PREFERRED EMBODIMENT

This invention will be explained in detail below with reference to the accompanying examples and comparative examples.

EXAMPLE 1

A polymerization system was constructed by connecting in series a first reactor (1R) consisting of a complete mixing type preheater having a volume of 3 l and a plug flow type reactor equipped with an agitator and having a volume of approximately 28 l, a second reactor (2R) consisting of a plug flow type tower reactor equipped with an agitator and having a volume of approximately 30 l, and third, fourth, and fifth reactors, each consisting of a plug flow type reactor equipped with a static mixer and having a volume of approximately 35 l.

A feed was prepared by mixing 100 parts by weight of a syrup consisting of 86.8 parts by weight of styrene and 13.2 parts by weight of polybutadiene with an SV of 450 centipoises, 25.0 parts by weight of ethylbenzene, and 0.035 part by weight of 1,1-di(tert-butylperoxy)cyclohexane as organic peroxide.

The feed was heated to 108° C. in the preheater and introduced continuously into the first reactor of the polymerization system at a rate of 14 l/hr. and allowed to polymerize at a speed of agitation of 140 rpm with the polymerization temperature controlled in such a manner as to provide a gradient increasing from 108° C. to 112° C. in the direction of the process flow.

The conversion at the outlet of the first reactor was 25.1% and the rubber in the reaction mixture was particulate. The conversion at the outlet of the preheater was 1.9%.

The abrupt heating was prevented near the inlet of the plug flow type reactor equipped with an agitator, resulting in no generation of gel-like foreign substances inside the reactor and no adhesion of incomplete polymerizates to the reactor wall.

The reaction mixture continuously withdrawn from the first reactor was introduced successively into the second reactor and those following thereafter and allowed to polymerize with the reaction temperature controlled so as to provide a gradient increasing from 115° C. to 160° C. in the direction of the process flow.

The effluent from the fifth reactor was devolatilized in the usual manner to remove the unchanged styrene and the solvent ethylbenzene, melt-extruded, cooled, and cut to yield the product in granules.

The product was tested for the rubber particle diameter, occluded polystyrene content, elongation (JIS K 7113 at a test speed of 500 mm/min.), falling weight impact strength (JIS K 7211, a weight with $R = \frac{1}{4}$ inch dropped from a height of 1 m. on 30 plate specimens with a thickness of 3 mm conditioned for 24 hrs. or more), and Izod impact strength (JIS K 7110). The results are shown in Tables 1 and 2.

The particle size distribution (weight distribution) of the rubber in the product is shown in FIG. 1.

The solid content of each effluent was determined by taking a specimen on the order of 1 to 2 g., drying it by devolatilization at 200° C. under reduced pressure near vacuum for 30 minutes, and calculating the weight of the residue in %.

The diameter of rubber particles was determined on a dispersion of the rubber particles in a dimethylformamide electrolyte with the aid of a Coulter Multisizer, a product of Coulter Electronics Inc.

The occluded polystyrene content was determined by treating 1 g. of a resin specimen with 40 ml of a 1:1 mixture of methyl ethyl ketone and acetone, settling the insoluble gels (rubber particles) by a centrifuge, discarding the supernatant liquid, drying the settled insoluble gels to a constant weight, weighing the gels, determining the proportion of the gels (gel content), and calculating as follows;

[(wt. % gel content)−(wt. % rubber content in product resin)]/(wt. % rubber content in product resin).

EXAMPLES 2-5

Except using polybutadiene of different SV and formulating the feed as shown in Table 1, the polymerization was carried out as in Example 1. The product was tested for the rubber particle diameter, occluded polystyrene content, elongation, falling weight impact strength, and Izod impact strength as in Example 1. The results are shown in Table 2.

The rubber in the reaction mixture at the outlet of the first reactor was particulate in each example.

TABLE 1

|  | Example | | | | |
| --- | --- | --- | --- | --- | --- |
|  | 1 | 2 | 3 | 4 | 5 |
| Styrene | 86.8 | 92.7 | 92.8 | 96.9 | 92.8 |
| Rubber | 13.2 | 7.2 | 7.1 | 3.1 | 7.1 |
| Ethylbenzene | 25.0 | 25.0 | 25.0 | 25.0 | 25.0 |
| Organic peroxide ($\times 10^{-2}$) | 0.044 | 0.044 | 0.063 | 0.044 | 0.063 |
| SV of rubber | 450 | 620 | 1,040 | 1,280 | 1,040 |
| $1.8 \log_{10}SV + \log_{10}R$ | 5.8 | 5.8 | 6.2 | 6.0 | 6.2 |

TABLE 2

|  | Example | | | | |
| --- | --- | --- | --- | --- | --- |
|  | 1 | 2 | 3 | 4 | 5 |
| Rubber content in reactants (%) | 10.6 | 5.8 | 5.7 | 2.5 | 5.7 |
| Organic peroxide (ppm) | 350 | 350 | 500 | 350 | 350 |
| Conversion at outlet of preheater (wt. %) | 1.9 | 2.0 | 2.0 | 1.0 | 7.0 |
| Agitation speed in 1R (rpm) | 140 | 120 | 120 | 110 | 120 |
| Conversion at outlet of 1R (%) | 25.1 | 24.6 | 28.3 | 24.3 | 30.0 |
| Rubber particle diameter at outlet of 1R ($\mu$m) | 2.8 | 2.5 | 2.5 | 2.6 | 2.6 |
| Occluded polystyrene at outlet of 1R (−) | 0.6 | 0.7 | 0.9 | 0.8 | 0.7 |
| Izod impact strength (kg.cm/cm) | 11.6 | 7.5 | 8.2 | 3.8 | 8.0 |
| Falling weight impact strength (kg.cm) | >300 | 176 | 233 | 44 | 190 |

COMPARATIVE EXAMPLES 1-3

Except formulating the feed at the ratios shown in Table 3, the polymerization was carried out as in Example 1. The products were tested for the rubber particle diameter, occluded polystyrene content, elongation, falling weight impact strength, and Izod impact strength as in Example 1. The results are shown in Table 4.

The rubber in the reaction mixture at the outlet of the first reactor was particulate in each comparative example. Moreover, the particle diameter distribution of the rubber has broadened markedly and gel-like substances adhered to the wall of the first reactor, making it difficult to continue the polymerization over a prolonged period of time.

COMPARATIVE EXAMPLE 4

The polymerization was carried out as in Example 1 except replacing the preheater and the first reactor with a complete mixing type reactor having a volume of approximately 30 l, keeping the polymerization temperature in the first reactor at 120° C., and applying the conditions shown in Tables 3 and 4.

TABLE 3

| | Comparative example | | | |
|---|---|---|---|---|
| | 1 | 2 | 3 | 4 |
| Styrene | 92.7 | 93.8 | 92.8 | 92.7 |
| Rubber | 7.2 | 6.2 | 7.1 | 7.3 |
| Ethylbenzene | 25.0 | 25.0 | 25.0 | 25.0 |
| Organic peroxide ($\times 10^{-2}$) | 0 | 0.044 | 0.063 | 0.044 |
| SV of rubber | 85 | 85 | 85 | 1,040 |
| 1.8 log SV + logR | 4.2 | 4.2 | 4.2 | 6.2 |

TABLE 4

| | Comparative example | | | |
|---|---|---|---|---|
| | 1 | 2 | 3 | 4 |
| Rubber content in reactants (%) | 5.8 | 5.0 | 5.7 | 5.8 |
| Organic peroxide (ppm) | 0 | 350 | 500 | 350 |
| Conversion at outlet of preheater (wt. %) | 2.0 | 2.0 | 2.0 | 2.0 |
| Agitation speed in 1R (rpm) | 120 | 120 | 40 | 160 |
| Conversion at outlet of 1R (%) | 23.9 | 24.5 | 28.5 | 24.0 |
| Rubber particle diameter at outlet of 1R ($\mu$m) | 2.3 | 1.4 | 2.1 | 2.5 |
| Occluded polystyrene at outlet of 1R (—) | 0.4 | 0.7 | 0.8 | 0.5 |
| Izod impact strength (kg.cm/cm) | 6.2 | 4.4 | 6.8 | 7.3 |
| Falling weight impact strength (kg.cm) | 24 | 21 | 43 | 65 |

The results of the Examples and Comparative Examples described above indicate that the process of this invention promotes the graft reaction in the initial phase of the polymerization and increases the content of occluded styrene polymers after the phase inversion and at the same time enables the production of rubber-modified styrene resins having an optimal average diameter and diameter distribution of the rubber particles and that the polymerization in plug flow type reactors can not only improve the resin properties markedly but also solve the problems of tim generation of gel-like foreign substances inside the reactor and the adhesion of incomplete polymerizates to the reactor wall.

What is claimed is:

1. A process for preparing rubber-modified styrene resins with excellent impact resistance which comprises:

preheating in a complete mixing tank, under conditions sufficient to support up to 10% conversion and under conditions prevailing prior to rubber phase inversion, a feed formulated from:
   100 parts by weight of reactants consisting of:
   98 to 88% by weight of styrene-monomer, and
   2 to 12% by weight of a high-viscosity rubber including polybutadiene and styrene-butadiene copolymer, wherein said rubber has a viscosity of 500 to 2,000 centipoises, wherein this viscosity is measured in a 5% by weight solution in styrene at 25° C.,
   0.01 by 0.2 part by weight of an inert organic solvent;

converting up to 10% of said monomer during said preheating to form a preheated feed comprising a continuous phase of said rubber dissolved in said monomer and a discontinuous phase of polymer particles;;

continuously supplying said preheated feed to one end of first reaction zone consisting of a plug flow tower equipped with an agitator or a plurality of such reaction zones connected in series;

effecting preliminary polymerization, in said first reaction zone with agitation, of said preheated feed to a conversion sufficient for transformation of said continuous phase of rubber dissolved in said monomer and discontinuous phase of polymer particles into a discontinuous phase of rubber dissolved in said monomer in a continuous phase of said polymer;

controlling the conditions of preliminary polymerization in said first reaction zone effective to cause rubber phase inversion and to limit the weight average particle diameter of said rubber particles in said reaction zone to 0.8 to 5 $\mu$m to thereby form a prepolymerized product;

withdrawing said prepolymerized product, comprising said discontinuous phase of rubber and unconverted styrene monomer in said continuous phase comprising said styrene polymer, from another end of said reaction zone different from the feed end thereof;

supplying said prepolymerized product to a following plug flow reaction zone, that includes static mixing means therein;

increasing conversion of said prepolymerized product within said following plug flow type reaction zone; and recovering rubber modified styrene resin from said following plug flow reaction zone.

2. A process for preparing rubber-modified styrene resins according to claim 1 wherein said rubber satisfies the relationship $$1.8 \log_{10} SV + \log_{10} R > 5.7$$

in which SV is the viscosity in centipoise of said rubber in a 5% by weight solution in styrene at 25° C. and R is the content in % by weight of said rubber in the reactants.

3. A process for preparing rubber-modified styrene resins according to claim 1 including carrying out said preliminary polymerization under conditions sufficient to convert 20 to 40% by weight of the monomer.

4. A process for preparing rubber-modified styrene resins according to claim 1 including supplying said prepolymerized feed to said following plug flow type reactor which reactor consists of a slender vertical tower reactor equipped with an agitator adapted to cause mild agitation and at least one plug flow type reactors fitted with a static mixer; and controlling said polymerization to a conversion of 60% by weight or less in said tower reactor and controlling said polymerization to a conversion of 60 to 100% by weight in said plug flow type reactors.

5. The process as claimed in claim 1 wherein said high viscosity rubber is one member selected from the group consisting of polybutadiene and styrene-butadiene copolymer.

6. The process as claimed in claim 1 wherein said high viscosity rubber is polybutadiene.

* * * * *